United States Patent [19]

Pinnau et al.

[11] Patent Number: 5,007,944
[45] Date of Patent: Apr. 16, 1991

[54] PROCESS FOR INCREASING THE SELECTIVITY OF ASYMMETRIC MEMBRANES

[75] Inventors: Ingo Pinnau, Hamburg; Jan Wind, Borsbüttel, both of Fed. Rep. of Germany

[73] Assignee: GKSS Forschungszentrum Geesthacht GmbH, Geesthacht, Fed. Rep. of Germany

[21] Appl. No.: 48,636

[22] Filed: May 11, 1987

[30] Foreign Application Priority Data

May 9, 1986 [DE] Fed. Rep. of Germany ....... 3615649

[51] Int. Cl.$^5$ ...................... B01D 53/22; B01D 71/64
[52] U.S. Cl. .......................... 55/16; 55/68; 55/158; 55/528
[58] Field of Search .............. 55/16, 68, 71, 158, 55/528; 210/500.39

[56] References Cited

U.S. PATENT DOCUMENTS

| | | | |
|---|---|---|---|
| 3,980,456 | 9/1976 | Browall | 55/158 |
| 4,156,597 | 5/1979 | Browall | 55/16 |
| 4,230,463 | 10/1980 | Henis et al. | 55/71 X |
| 4,472,175 | 9/1984 | Malon et al. | 55/158 X |
| 4,474,858 | 10/1984 | Makino et al. | 55/158 X |
| 4,486,202 | 12/1984 | Malon et al. | 55/158 |
| 4,486,376 | 12/1984 | Makino et al. | 210/500.39 X |
| 4,528,004 | 7/1985 | Makino et al. | 55/158 |
| 4,575,385 | 3/1986 | Brooks et al. | 55/158 |
| 4,606,740 | 8/1986 | Kulprathipanja | 55/158 X |
| 4,654,055 | 3/1987 | Malon et al. | 55/158 |
| 4,673,418 | 6/1987 | Peinemann | 55/158 |
| 4,695,295 | 9/1987 | Dorman et al. | 55/16 |

Primary Examiner—Robert Spitzer
Attorney, Agent, or Firm—Spencer & Frank

[57] ABSTRACT

A method for producing an improved membrane for separating gases in mixtures including forming an integral, asymmetric polyether imide membrane, treating the membrane with at least one organic fluid which is a solvent or swelling agent for polyether imide, and removing the organic fluid from the membrane by evaporation to obtain a tubular, flat or hollow fiber membrane exhibiting significantly higher selectivity than an untreated membrane.

12 Claims, 1 Drawing Sheet

PROCESS FOR INCREASING THE SELECTIVITY OF ASYMMETRIC MEMBRANES

FIELD OF THE INVENTION

The present invention relates to a process for increasing the selectivity of an integrally asymmetric membrane for the separation of gases from one another.

TECHNOLOGY REVIEW

Compared to conventional gas separation methods, such as low temperature distillation, and chemical and physical absorption, membrane separations can be operated with less energy. Membrane separation processes are distinguished by great process flexibility, compactness, simple operation and low maintenance costs.

A membrane for the separation of gases should meet the following requirements:

1. be highly selective with respect to various separation problems;
2. exhibit high permeation rates for the faster gas components;
3. exhibit high mechanical strength;
4. exhibit high temperature resistance;
5. exhibit high chemical stability with respect to components of natural or synthetic gas mixtures;
6. be easy and as economical as possible to manufacture; and
7. be manufactured by a process that is easily reproduced.

The primary requirement for a gas separation membrane is high selectivity for one or more gases of a gas mixture compared to one or more gases remaining in the mixture with sufficiently high permeation rates for the faster gas components. Membranes which have a low selectivity but produce high flow rates or those having low flow rates but high selectivities require very large membrane surfaces for the separation of substances and thus require considerable capital investment costs.

Generally, polymer membranes with high permeation rates (e.g. elastomers) have low selectivities and membranes with high selectivities (e.g. glass-like plastics) have low permeation rates. To realize the highest possible permeation rates, it is important to make the separating layer of the membrane very thin since the flow of gas is inversely proportional to the thickness of the membrane.

Glass-like polymers which have excellent selectivities can be economically used as gas separating membranes only with membrane layer thicknesses of $<1$ $\mu m$. However polymer films this thin that are absolutely free of flaws are practically impossible to produce since dust particles having a size of about 3000 Å may readily initiate flaws which greatly reduce selectivity.

Asymmetric membranes are composed of a selective separating layer having a thickness of about 0.1 to 0.3 $\mu m$, as well as a porous substructure about 100 to 150 $\mu m$ thick which gives the membrane the necessary stability. A wide-spread process for producing asymmetric gas separation membranes is the phase inversion process. In spite of the most intensive research work, manufacturing a separating layer without flaws continues to be a difficult problem.

A significant improvement in the production of gas separation membranes without flaws was achieved by Henis et al with their development of multi-layer membranes (U.S. Pat. No. 4,230,463).

Flaws in an asymmetric polymer membrane may be plugged with the aid of an elastomer coating so that the substance specific selectivity of the material of the asymmetric membrane is approximately realized with sufficiently high permeation rates. Gas transport through an asymmetric membrane having pores in the selective separating layer is effected by way of Knudsen flow or convection, while in a multi-layer membrane such gas transport is determined by solution-diffusion behavior.

Chemical or thermal secondary treatment processes to reduce the surface porosity of asymmetric gas separation membranes often bring about a drastic reduction in flow for the faster gas components. However, Malon et al (U.S. Pat. No. 4,472,175) describe hollow and flat membranes having asymmetric structures produced by secondary treatment with Bronsted-Lowry or Lewis acids, with such membranes exhibiting the desirable high permeation characteristics of elastomer coated membranes.

Polyetherimide is a glass-like, temperature resistant polymer having excellent substance specific separating characteristics for one or a plurality of gases with respect to other gases of a gas mixture. Browall (U.S. Pat. No. 4,156,597) describes a polyetherimide membrane having a thickness of about 10 $\mu m$ with the following relative selectivities with respect to $N_2$:

| Gas | Selectivity |
| --- | --- |
| $N_2$ | 1.00 |
| $C_2H_4$ | 1.01 |
| Ar | 1.38 |
| $CH_4$ | 1.39 |
| CO | 1.83 |
| $O_2$ | 5.30 |
| $CO_2$ | 24.50 |
| $H_2$ | 71.50 |
| $NH_3$ | 134.00 |

Although this membrane exhibits good selectivities for various separating problems, its practical and economical use is rather questionable since the membrane layer thickness is much too high to permit sufficient flow rates for the faster gases.

Peinemann, U.S. Pat. No. 4,673,418 filed, discloses how asymmetric polyetherimide membranes can be produced which have an effective separating layer of 0.3 $\mu m$. These membranes, when configured as multilayer membranes, exhibit much greater selectivities and permeation rates when compared to membranes produced by the process described by Browall. However, in order to achieve high selectivities, it is absolutely necessary to coat these asymmetric polyetherimide membranes with an elastomer film.

SUMMARY OF THE INVENTION

The invention provides a method for producing an improved membrane for separating gases in mixtures including forming an integral, asymmetric polyether imide membrane, treating the membrane with at least one organic fluid which is a solvent or swelling agent for polyether imide, and removing the organic fluid from the membrane by evaporation to obtain a tubular, flat or hollow fiber membrane exhibiting significantly higher selectivity than an untreated membrane.

It is an object of the present invention to improve the above described process so that a significant increase in selectivity can be realized with only a slight decrease in permeation rates for the faster permeants by removing or reducing existing flaws in an asymmetric polyether imide membrane.

DETAILED DESCRIPTION OF THE INVENTION

Surprisingly it has now been found that when the selective separating layer of an asymmetric polyetherimide membrane is treated with an organic fluid which has an affinity for polyether imide, the treated membrane exhibits significantly higher selectivities than an untreated membrane. By an "affinity" for polyether imide, an organic fluid which is a solvent or swelling agent for polyether imide is meant. Treatment with solutions of these "active" organic fluids containing glass-like polymers increases membrane selectivity still more with only a slight reduction in the flow of the faster gas components. Further coating of the treated membranes with a thermoplastic elastomer results in membranes whose selectivity is higher than that of untreated, silicone coated membranes.

The membrane material as well as the structure of an asymmetric membrane, may both affect secondary treatment processes to increase membrane selectivity. Generally, chemical or thermal secondary treatment processes result in a considerable reduction of permeation rates for the faster gases.

The invention will be described in greater detail below with reference to embodiments illustrated in FIGS. 1 to 3 and to tables.

Figure 1:
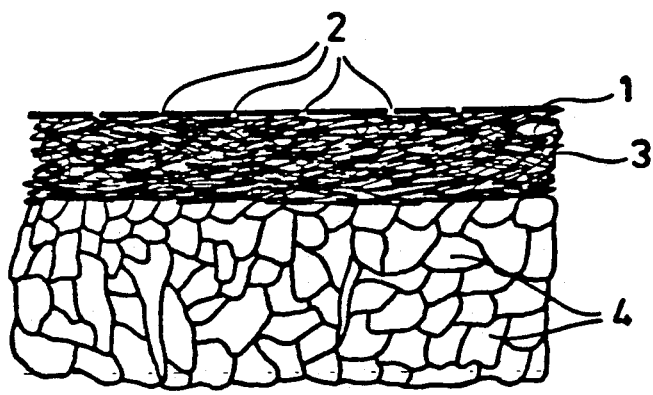
FIG. 1 illustrates a cross section of the structure of an untreated asymmetric polyether imide membrane.

FIG. 1 shows the schematic structure of an asymmetric polyether imide membrane. It is composed of a thin selective layer 1 of about 0.1 to 0.3 μm, a subsequent, highly condensed layer 3 of a thickness of about 10 μm and a further, highly porous supporting layer 4 having a thickness of about 120 to 150 μm. Layers 3 and 4 are completely permeable to gas and impart mechanical strength to the asymmetric membrane. If selective layer 1 contains no flaws 2 at all, the resulting membranes are specifically substance selective for the material of this selective layer, but even slight surface defects greatly reduce the selectivity of an asymmetric membrane.

The production of highly selective polyether imide membranes according to the process of the invention is very simple. As illustrated in FIG. 2, the selective layer 1 of an asymmetric polyether imide membrane is treated with an organic fluid having a high affinity for polyether imide or with a solution of highly selective polymers in these organic fluids. Suitable treatments include, for example immersion, spraying, painting, and the like.

Thus, a uniform film 5 of a highly selective polymer is formed on selective layer 1. All existing flaws in selective layer 1 are completely filled with an organic fluid. Since the organic fluid has an affinity for polyetherimide, selective layer 1 swells, resulting in a considerable increase in volume of the selective layer. Due to the resulting expansion of layer 1, the outer walls 8a and 8b of the pores come closer together. With very small pore diameters, the pores may even be completely closed (FIG. 3, 8'). The high density zone 3 has a significant influence on the process according to the invention. As already mentioned, this membrane region poses no resistance to the flow of gases. However, the high density zone 3 must offer considerable resistance to the organic fluid, i.e. the organic fluid must not be dispersed in this layer to any noticeable degree since an increase in the density of this layer would increase the effective membrane layer thickness to $<10\mu m$ which would result in a significant reduction of the permeation rates for the faster gas components. However, if the resistance of the high density zone 3, is so great that the organic fluid remains on its upper part, the density of zone 3 in this region may be desirably increased causing the closing of pores 2 from the inside.

Figure 3:
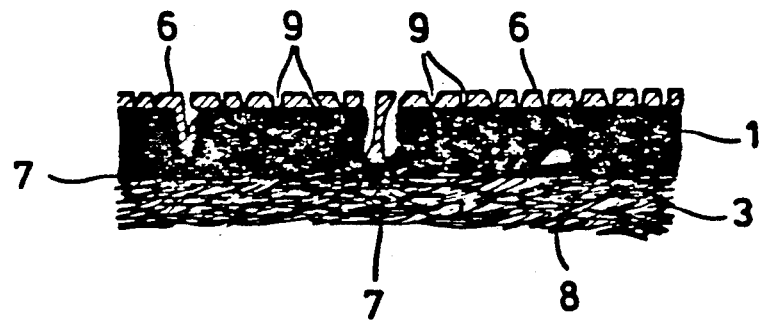
FIG. 3 illustrates an enlarged cross section of a treated surface of an asymmetric polyether imide membrane, including a layer of a highly selective flaw-free polymer (6) on selective layer (1).

As illustrated in FIG. 3, if a highly selective polymer (e.g. polyether imide) is dissolved in the organic fluid employed, this polymer 6 remains on selective layer 1 after the fluid has completely evaporated and also remains in pores 8 of the asymmetric membrane. Providing a significant increase of the selectivity of an asymmetric polyetherimide membrane it is not necessary to obtain a layer of this additional highly selective polymer 6 which is absolutely free of flaws. Rather, the use of a highly selective polymer plugs very small pores and further constricts larger pores. The result is a polyether imide membrane having improved selectivity compared to untreated membranes or membranes treated only with fluid.

The magnitude of the increase in selectivity depends on the type of organic fluids employed, the period of contact, the temperature, the concentration of the highly selective additional polymers and the like.

An additional coating of the selective layer with a linear styrene-ethylene-butylene-styrene block copolymer serves as protection for the highly sensitive separating layer against external influences (e.g. further processing of the membranes into modules). Moreover, the few, remaining flaws in the improved membrane are plugged so that selectivity of the membrane can be increased still more.

Meant is that the additional coating shall protect the sensitive selective layer e.g. against scratching during the installation of the membranes into modules.

The asymmetric membrane is made of a commercially available polyether imide having the following structure formula:

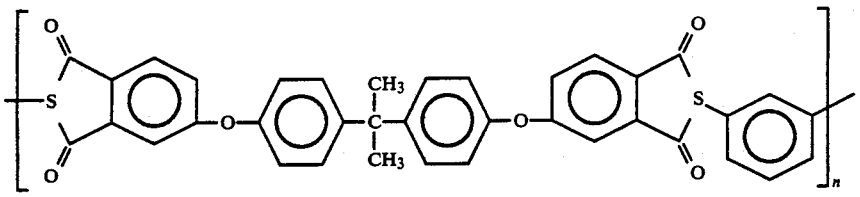

Commercially available types of polyether imide (e.g. ULTEM-brand polyether imide, manufactured by General Electric Co.) differ considerably in their resistance to chemicals and in their viscosity in solution For the Examples of the present invention described below, untreated flat polyether imide membranes as described in U.S. Pat. No. 4,673,418 are employed. However, the process of the invention can also be used to treat hollow fiber or tubular membranes made of polyether imide which have the same general characteristics as untreated flat polyether imide membranes.

All organic fluids can be used as long as they have an affinity to polyether imide, that is, solvent or swelling agent behavior with respect to polyether imide. Particularly favorable are straight chain or cyclic alkyl ketones of 3 to 8 carbons, particularly ethyl methyl ketone and cyclohexanone, alkyl esters of 2 to 6 carbons, particularly methyl formate, ethyl formate, methyl acetate and ethyl acetate, alkyl benzenes of 7 to 9 carbons, particularly xylene and toluene, as well as chlorinated hydrocarbons containing 1 to 4 carbon atoms, particularly dichloromethane, chloroform, 1,1,2-trichloroethane and trichloroethylene as well as all mixtures of the mentioned classes of substances.

Figure 2:
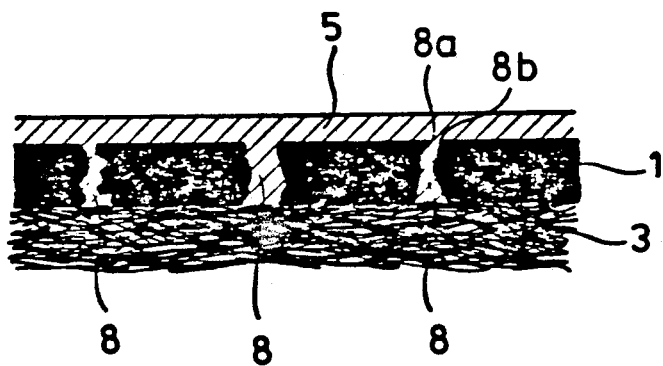
FIG. 2 illustrates an enlarged cross section of a treated surface of an asymmetric polyether imide membrane, including a uniform film (5) which completely fills existing flaws in selective layer (1).

All polymers which are soluble in at least one of the above-mentioned organic fluids at room temperature conditions and at higher temperatures (up to 200° C.) may be used to form the uniform film (5) illustrated in FIG. 2. For example, polyether imides having the following structure:

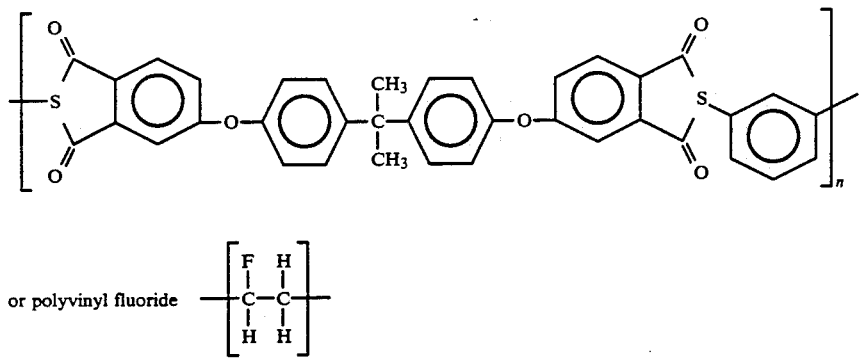

may be used.

The additional coating on the polyether imide membrane may, for example, be a, styrene-ethylene-butylene-styrene block copolymer. Kraton G, manufactured by Shell Chemical Co. is an example of such a block copolymer.

In order that those skilled in the art may better understand how the present invention may be practiced, the following examples are given by way of illustration and not by way of limitation.

EXAMPLE 1

All asymmetrical polyetherimide membranes employed in these examples were manufactured according to the process developed by Peinemann and described in U.S. Pat. No. 4,673,418 The membranes were dried in a drying box at 150° C. Table 1 shows the separation characteristics of untreated asymmetric polyetherimide membranes for various gases at 22° C. and a partial pressure difference of 5 bar.

TABLE 1

| | Separation characteristics of untreated asymmetric polyetherimide membranes | | | | |
|---|---|---|---|---|---|
| No. | $P/l_{He}$ ($m^3/m^2 hbar$) | $P/l_{CO_2}$ ($m^3/m^2 hbar$) | $P/l_{N_2}$ ($m^3/m^2 hbar$) | $\alpha_{N_2}^{He}$ | $\alpha_{N_2}^{CO_2}$ |
| 1 | 0.337 | 0.060 | 0.020 | 17 | 3 |
| 2 | 0.344 | — | 0.029 | 12 | — |
| 3 | 0.401 | — | 0.055 | 7 | — |

Further measurements indicated helium permeation rates of 0.3 to 0.6 $m^3/m^2 hbar$ with $He/N_2$ selectivities between 5 and 20. It has been found that the separation does not take place exclusively according to a Knudsen flow since then the theoretical $He/N_2$ selectivity would only be 2.65.

Although untreated polyether imide membranes exhibit excellent permeation rates for the faster gas components, their general use in gas separating membranes is uneconomical since their selectivities are much too low (very large membrane surface required for substance separation, requiring large capital investment costs).

$P/l$ is the permeation rate of the membrane to the indicated gas (cubic meters of gas per square meters of membrane surface area per hour and partial pressure difference of $\lambda \tau$). $\alpha$ is the selectivity for a pair of gases.

TABLE 2

Separation characteristics of asymmetric polyetherimide membranes after treatment with various organic fluids

| Treatment | No. | $P/l_{He}$ (m³/m²hbar) | $P/l_{N_2}$ (m³/m²hbar) | $\alpha_{N_2}^{He}$ |
|---|---|---|---|---|
| 1 × ethyl acetate | 4 | 0.285 | 0.003000 | 95 |
| 2 × ethyl acetate | 5 | 0.191 | 0.000849 | 225 |
| 5 × ethyl acetate | 6 | 0.222 | 0.001390 | 159 |
| 5 × ethyl acetate | 7 | 0.329 | 0.002340 | 141 |
| 5 × ethyl acetate | 8 | 0.185 | 0.000841 | 220 |
| 2 × ethyl methyl ketone | 9 | 0.186 | 0.000900 | 207 |
| 4 × methyl formate | 10 | 0.228 | 0.001500 | 150 |

All membranes of Table 2 were dried at 150° C. The treatment of the selective layer was effected by one-time or repeated painting with various organic fluids and subsequent drying at 150° C.

A comparison of the separation characteristics of the treated membranes with those of the untreated membranes (Table 1) indicated significantly increased selectivities with not much reduction in permeation rates for the faster permeants. Deviations of the selectivities and permeation rates result, in spite of identical treatment, from the different characteristics of the respective untreated asymmetric polyetherimide membranes. Peinemann, U.S. Pat. No. 4,673,418, lists, for silicone treated polyetherimide membranes, a He permeability of 0.25 m³/m²hbar and a He-N₂ selectivity of 144.

The magnitude of the increase in selectivity is dependent on the type of organic fluid, and on the period of contact as well as the temperature. It is important, for example, to predry the moist, treated membranes and then to remove the remaining components of the organic fluids afterwards at a higher temperature.

TABLE 3

Separating characteristics of asymmetric polyetherimide membranes after treatment with solutions of highly selective polymers

| Treatment | No. | $P/l_{He}$ (m³/m²hbar) | $P/l_{N_2}$ (m³/m²hbar) | $\alpha_{N_2}^{He}$ |
|---|---|---|---|---|
| Polyether imide dissolved in ethyl methyl ketone/cyclohexanone 1:1 | | | | |
| 1 × | 11 | 0.324 | 0.003400 | 95 |
| 2 × | 12 | 0.210 | 0.000726 | 290 |
| 2 × | 13 | 0.216 | 0.000877 | 246 |
| 2 × | 14 | 0.255 | 0.001420 | 180 |
| 3 × | 15 | 0.241 | 0.000975 | 247 |
| 3 × | 16 | 0.222 | 0.000822 | 270 |
| polyether imide dissolved in cyclohexanone | | | | |
| 1 × | 17 | 0.312 | 0.001710 | 182 |
| 1 × | 18 | 0.319 | 0.002510 | 127 |
| polyvinyl fluoride dissolved in cyclohexanone | | | | |
| 1 × | 19 | 0.204 | 0.000771 | 264 |
| 1 × | 20 | 0.270 | 0.002420 | 112 |

As can be seen in Table 3, the selectivity of asymmetric polyetherimide membranes is increased considerably by treatment with solutions of highly selective polymers. The membranes were treated by one-time or repeated painting and subsequent evaporation of the organic fluids.

TABLE 4

Separating characteristics of asymmetric polyetherimide membranes after treatment with solutions of highly selective polymers and subsequent coating with a styrene-ethylene-butylene-styrene block copolymer

| Treatment | No. | $P/l_{He}$ (m³/m²hbar) | $P/l_{N_2}$ (m³/m²hbar) | $\alpha_{N_2}^{He}$ |
|---|---|---|---|---|
| polyvinyl fluoride dissolved in cyclohexanone 1 × + coating with Kraton G 1651 | | | | |
| | 21 | 0.234 | 0.000870 | 269 |
| | 22 | 0.245 | 0.000968 | 253 |

TABLE 5

Separating characteristics of asymmetric polyetherimide membranes for various gases after one-time treatment with polyetherimide-cyclohexanone solution and one-time coating with styrene-ethylene-butylene-styrene block copolymer

| Gas | P/l (m³/m²hbar) | Selectivity (—) |
|---|---|---|
| CH₄ | 0.000558 | He/N₂ = 259 |
| N₂ | 0.000690 | He/Ar = 200 |
| Ar | 0.000896 | H₂/CH₄ = 247 |
| CO | 0.001390 | H₂/CO₂ = 5.9 |
| O₂ | 0.006280 | H₂/CO = 99 |
| CO₂ | 0.023300 | CO₂/CH₄ = 42 |
| H₂ | 0.138000 | CO₂/CO = 17 |
| He | 0.179000 | O₂/N₂ = 9.1 |

Tables 4 and 5 show the separation characteristics of asymmetric polyether imide membranes which, after being treated with solutions of highly selective polymers, were additionally coated with a thermoplastic elastomer. Membranes resulted which had higher selectivities than the membranes treated with solutions of highly selective polymers. The styrene-ethylene-butylene-styrene block copolymer thus closes the few still remaining flaws in the selective layer of the treated membrane with only a very slight decrease in permeation rates for the faster gas components.

TABLE 6

Separating characteristics of asymmetric polyetherimide membranes after coating with styrene-ethylene-butylene-styrene block copolymer and two subsequent treatments with polyvinyl fluoride dissolved in methyl ethyl ketone

| Treatment No. | $P/l_{He}$ | $P/l_{N_2}$ | $P/l_{CH_4}$ (m³/m²hbar) | $P/l_{CO}$ | $P/l_{H_2}$ |
|---|---|---|---|---|---|
| Coating with styrene-ethylene-butylene-styrene block copolymer + polyvinyl fluoride dissolved in methyl ethyl ketone 2 × | | | | | |
| 23 | 0.175 | 0.00058 | 0.00048 | 0.0010 | 0.120 |

The membrane according to Table 6 was first painted with a 0.10% Kraton G 1651 solution. After the solvent (cyclohexane) had been completely removed, the surface was painted twice with a solution of polyvinyl fluoride in methyl ethyl ketone. The separation characteristics of the membranes were similar to those subjected to the reverse treatment (Tables 4 and 5).

The listed examples clearly show that the process according to the invention for increasing the selectivity of asymmetric polyetherimide membranes can be used in many ways and, if the process parameters are fixed precisely, results in highly selective membranes which can be used for many purposes (He/N₂, He/Ar, H₂/CH₄, H₂/CO, H₂/CO₂, CO₂/CH₄, CO₂/CO and O₂/N₂ separation).

The present disclosure relates to the subject matter disclosed in German patent application No. P 36 15 649.3 filed in the Federal Republic of Germany on May 9, 1986, the entire specification of which is incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for producing integral, asymmetric membranes for separating gases in mixture, comprising:
    mixing together a polyether imide membrane forming polymer which forms membranes that are permeable to at least one gas in a mixture of gases, a volatile solvent for said polymer having a lower boiling point than any other component in the mixture, and an organic liquid swelling agent in which said polymer is not soluble and which does not react with either said polymer or said solvent, to form a pourable liquid mixture;
    spreading said liquid mixture to form a thin film;
    exposing said thin film to air or an inert gas to form a surface skin by evaporation;
    contacting said thin film with a precipitation agent to form an integral, asymmetric polyether imide membrane;
    treating said membrane with an organic fluid which is a solvent for polyether imide, or a swelling agent in which said membrane is not soluble, and a selective polymer dissolved in said organic fluid selected from the group consisting of polyether imide and polyvinyl fluoride, and
    removing said organic fluid.

2. The process set forth in claim 1 including coating said polyether imide membrane with a styrene-ethylene-butylene-styrene block copolymer dissolved in toluene or cyclohexane.

3. A method of separating gases in mixture, comprising:
    contacting a mixture of gases to be separated with an integral asymmetric membrane produced by the process of claim 2, and
    separating at least one gas from said gases in mixture by permeation through said membrane.

4. A method of separating gases in mixture, comprising:
    contacting a mixture of gases to be separated with an integral asymmetric membrane produced by the process of claim 1, and
    separating at least one gas from said gases in mixture by permeation through said membrane.

5. A flat integral asymmetric membrane for separating gases in mixtures produced by the process of claim 1.

6. A tubular integral asymmetric membrane for separating gases in mixtures produced by the method of claim 1.

7. A hollow fiber, integral, asymmetric membrane for separating gases in mixtures produced by the process of claim 1.

8. A method for producing integral, asymmetric membranes for separating gases in mixture, comprising:
    mixing together a polyether imide membrane forming polymer which forms membranes that are permeable to at least one gas in a mixture of gases, a volatile solvent for said polymer having a lower boiling point than any other component in the mixture, and an organic liquid swelling agent in which said polymer is not soluble and which does not react with either said polymer or said solvent, to form a pourable liquid mixture;
    separating said liquid mixture to form a thin film;
    exposing said thin film to air or an inert gas to form a surface skin by evaporation;
    contacting said thin film with a precipitation agent to form an integral, asymmetric polyether imide membrane;
    treating said membrane with an organic fluid selected from the group consisting of alkyl ketones of 3 to 8 carbon atoms, alkyl esters containing 2 to 6 carbon atoms, alkyl benzenes containing 7 to 9 carbon atoms, and chlorinated hydrocarbons containing 1 to 4 carbon atoms, said organic fluid being a solvent for polyether imide, or a swelling agent in which said membrane is not soluble, and a selective polymer dissolved in said organic fluid selected from the group consisting of polyether imide and polyvinyl fluoride, and
    removing said organic fluid.

9. The process set forth in claim 8, wherein said organic fluid is an alkyl ketone of 3 to 8 carbon atoms.

10. The process set forth in claim 8, wherein said organic fluid is an alkyl ester containing 2 to 6 carbon atoms.

11. The process set forth in claim 8, wherein said organic fluid is an alkyl benzene containing 7 to 9 carbon atoms.

12. The process set forth in claim 8, wherein said organic fluid is an chlorinated hydrocarbon containing 1 to 4 carbon atoms.

* * * * *